United States Patent
Okamura et al.

(10) Patent No.: US 9,332,184 B2
(45) Date of Patent: May 3, 2016

(54) IMAGE-SHAKE CORRECTION APPARATUS AND IMAGING APPARATUS INCORPORATING THE SAME

(71) Applicant: OLYMPUS CORPORATION, Tokyo (JP)

(72) Inventors: Takashi Okamura, Tokyo (JP); Akihiro Kubota, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 100 days.

(21) Appl. No.: 14/225,713

(22) Filed: Mar. 26, 2014

(65) Prior Publication Data

US 2014/0293073 A1    Oct. 2, 2014

Related U.S. Application Data

(63) Continuation of application No. PCT/JP2012/065250, filed on Jun. 14, 2012.

(30) Foreign Application Priority Data

Sep. 29, 2011 (JP) ................................ 2011-214318
Sep. 29, 2011 (JP) ................................ 2011-214319

(51) Int. Cl.
H04N 5/228 (2006.01)
H04N 5/232 (2006.01)
H04N 5/225 (2006.01)

(52) U.S. Cl.
CPC ......... H04N 5/23264 (2013.01); H04N 5/2253 (2013.01); H04N 5/23287 (2013.01); G03B 2205/0038 (2013.01)

(58) Field of Classification Search
None
See application file for complete search history.

(56) References Cited

U.S. PATENT DOCUMENTS

| 5,266,988 | A  | * | 11/1993 | Washisu | B82Y 15/00 396/13 |
| 9,232,141 | B2 | * | 1/2016 | Nishihara | H04N 5/2328 |
| 2005/0190267 | A1 | * | 9/2005 | Uenaka | G03B 5/00 348/208.99 |
| 2006/0018646 | A1 | * | 1/2006 | Stavely | G03B 17/02 396/55 |
| 2006/0284495 | A1 | * | 12/2006 | Seo | H04N 5/23248 310/12.06 |
| 2008/0151063 | A1 | * | 6/2008 | Mogamiya | H04N 5/2253 348/208.2 |
| 2008/0225126 | A1 | * | 9/2008 | Mogamiya | H04N 5/23248 348/208.4 |
| 2011/0013030 | A1 | * | 1/2011 | Lee | G03B 5/00 348/208.11 |
| 2011/0279899 | A1 | * | 11/2011 | Motoike | G03B 5/00 359/557 |

(Continued)

FOREIGN PATENT DOCUMENTS

| JP | 11-344739 A | 12/1999 |
| JP | 2007-116854 A | 5/2007 |
| JP | 2008-281660 A | 11/2008 |

OTHER PUBLICATIONS

International Search Report dated Jul. 17, 2012 issued in PCT/JP2012/065250.

*Primary Examiner* — Twyler Haskins
*Assistant Examiner* — Wesley J Chiu
(74) *Attorney, Agent, or Firm* — Scully, Scott, Murphy & Presser, PC

(57) ABSTRACT

The image-shake correction apparatus 1 of the invention comprises a base part 10 including a permanent magnet 20 and a moving part 30 having a coil 40 located in a position opposite to the permanent magnet 20, wherein the permanent magnet 20 and coil 40 form together a voice coil motor 70, and the permanent magnet 20 includes cutouts 101, 102 and 103.

16 Claims, 21 Drawing Sheets

(56) References Cited

U.S. PATENT DOCUMENTS

| | | | |
|---|---|---|---|
| 2012/0038784 A1* | 2/2012 | Irisawa | G03B 5/00 348/208.7 |
| 2013/0021685 A1* | 1/2013 | Fan | G02B 7/021 359/824 |
| 2013/0300336 A1* | 11/2013 | Ishikawa | G03B 5/00 318/610 |
| 2014/0212118 A1* | 7/2014 | Shimoyama | G03B 5/00 396/55 |
| 2014/0375829 A1* | 12/2014 | Nishihara | G03B 5/00 348/208.7 |
| 2014/0379103 A1* | 12/2014 | Ishikawa | H02P 29/0094 700/56 |

* cited by examiner

IMAGE-SHAKE CORRECTION APPARATUS AND IMAGING APPARATUS INCORPORATING THE SAME

CROSS REFERENCE TO RELATED APPLICATIONS

This application is a continuation application of PCT/JP2012/065250 filed on Jun. 14, 2012 and claims benefit of Japanese Application Nos. 2011-214318 and 2011-214319 both filed in Japan on Sep. 29, 2011.

BACKGROUND OF THE INVENTION

The present invention relates to an image-shake correction apparatus designed to displace an imaging device to make correction for image-shake caused by shaking, and an imaging apparatus incorporating the same.

One typical prior camera-shake correction apparatus is disclosed in JP(A) 2008-281660. This camera-shake correction apparatus comprises a fixed support substrate fixed to the internal surface of a camera body with a permanent magnet supported on it, and a yoke plate formed of a magnetic material substantially parallel with the fixed support substrate to form a magnetic circuit between it and the magnet fixed to the fixed support substrate, wherein the yoke plate is fixed by fixing screws to a plurality of shafts projecting integrally from the fixed support substrate. Between the fixed support plate and the yoke plate there is a stage plate positioned that is slidable with respect to both and has an imaging device supported on its front. The opposing surface of the stage plate in opposition to the permanent magnet is fixedly provided with a plurality of driving coils, each positioned within a magnetic field of the associated magnetic circuit.

This camera-shake correction apparatus operates such that as currents flow through the driving coils upon occurrence of camera-shake, it causes the driving coils with currents flowing through them to generate driving forces for sliding movement of the stage plate and imaging device, whereupon the imaging device slides in a direction of canceling out camera-shake thereby correcting it for image-shake.

SUMMARY OF THE INVENTION

According to a certain aspect of the invention, the image-shake correction apparatus comprises a base part including a permanent magnet and a moving part having a coil located in a position opposite to the permanent magnet, wherein said permanent magnet and said coil form together a voice coil motor, and said permanent magnet includes a cutout.

DESCRIPTION OF THE EMBODIMENTS

With the arrangement of JP(A) 2008-281660, the permanent magnet disposed on the fixed support substrate must be located in such a position as to avoid interference with a movably supported moving part allover its movement range, providing an obstacle to the size reductions of the stage system.

It is also required to have a plurality of voice coil motors each comprising a coil-permanent magnet pair, and the permanent magnets must then be spaced away by a given distance to prevent the coils from being influenced by a magnetic field of a permanent magnet other than the permanent magnet forming a pair with the coil. This also provides an obstacle to size reductions.

Specific objects of the embodiment are to provide an image-shake correction apparatus of smaller size than ever before, and an imaging apparatus incorporating the same.

One embodiment of the invention will now be explained.

According to this aspect of the embodiment, it is possible to provide an image-shake correction apparatus of smaller size.

Figure 1:
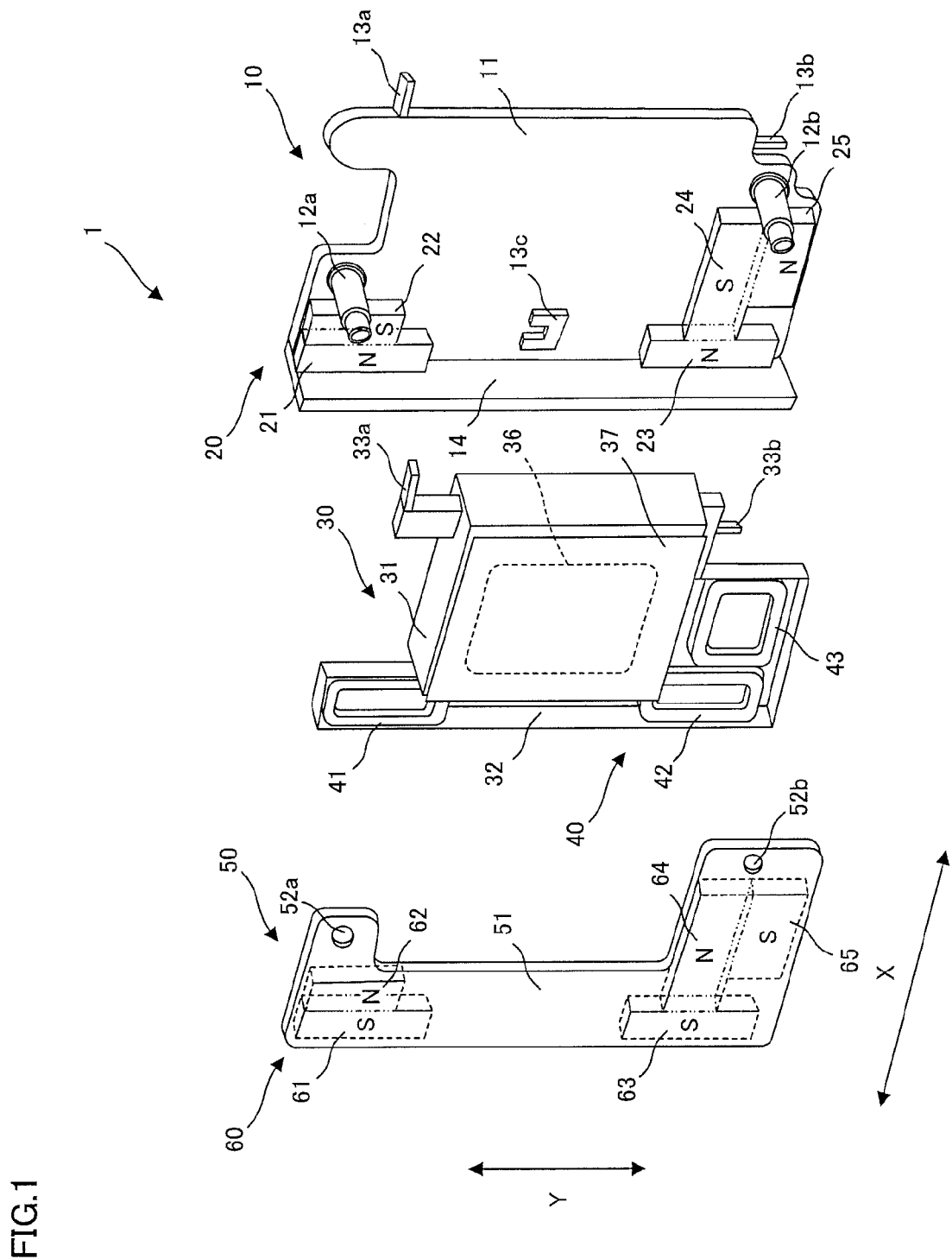
FIG. 1 is illustrative of the before-assembly image- shake correction apparatus 1 according to the first embodiment of the invention.

FIG. 1 is illustrative of the before-assembly image-shake correction apparatus 1 according to the first embodiment of the invention.

The image-shake correction apparatus 1 according to the first embodiment of the invention comprises a base part 10, a moving part 30 movably supported on the base part 10, and a magnet support portion 50 that is opposed to the base part 10 with the moving part 30 between them and fixed to the base part 10.

The base part 10 is fixedly provided with a first permanent magnet group 20, and the magnet support portion 50 is fixedly provided with a second permanent magnet group 60. The moving part 30 is fixedly provided with a coil group 40. The first and second permanent magnet groups 20 and 60 include oppositely magnetized and located portions in such a way as to generate a magnetic field in an opposite space. The coil group 40 is located in a space where the first permanent magnet group 20 is opposite to the second permanent magnet group 60. In FIG. 1 and the following figures, it is noted that the magnetic poles of the first and second permanent magnet groups 20 and 60 face on the side of the coil group 40.

Figure 2:
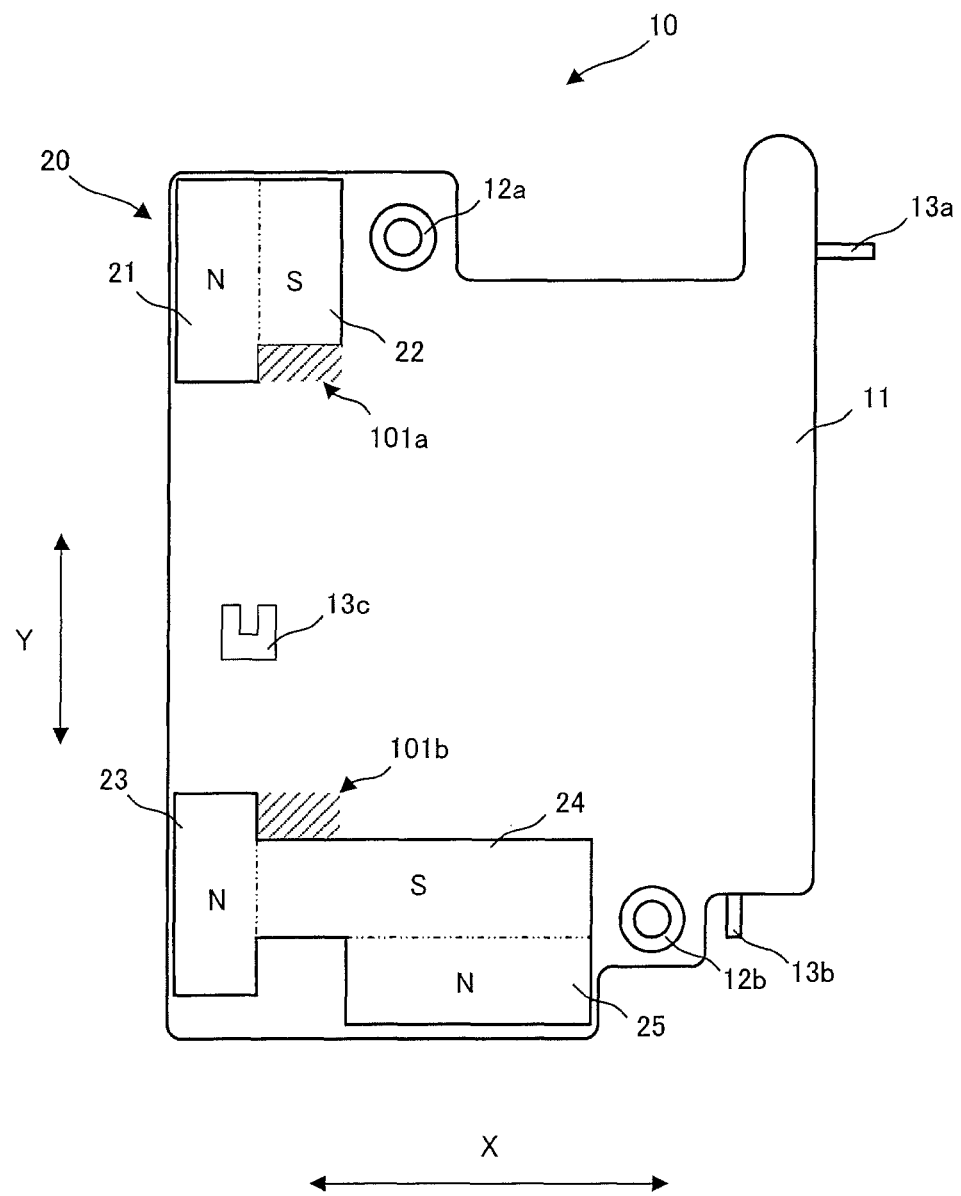
FIG. 2 is illustrative of the base part 10.

FIG. 2 is illustrative of the base part 10.

The base part 10 comprises a flat plate base body 11 formed of a magnetic material such as iron or an iron compound, supporting through-holes 12*a* and 12*b* that are provided through the base body 11 for inserting screws (not shown) through them to support the magnet support portion 50 on the base part 10, and a first assembly of spring supports 13*a*, 13*b* and 13*c* for supporting springs (not shown) to support the moving part 30 on the base part 10 in a movable manner.

Here the X direction is defined as a first direction to the base part 10, and the Y direction is defined as a second direction orthogonal to the X direction, as depicted in FIG. 2.

The first permanent magnet group 20 on the base part 10 comprises a first magnet portion 21 that is N-polarized (magnetized) on the coil group 40 side, a second magnet portion 22 that opposes to the first magnet portion 21 in the X direction and is S-polarized on the coil group 40 side, a third magnet portion 23 that is located away from the first magnet portion 21 in the Y direction and N-polarized on the coil group 40 side, a fourth magnet portion 24 that opposes to the third magnet portion 23 in the X direction and is S-polarized on the coil group 40 side, and a fifth magnet portion 25 that opposes to the fourth magnet portion 24 in the Y direction and N-polarized on the coil group 40 side. Note here that the faces of the first 21 to the fifth magnet portion 25 on the coil group 40 side and the opposite side are oppositely polarized.

The side of the second magnet portion 22 in the Y direction of the fourth magnet portion 24 is shorter than the first magnet portion 21 with a first space 101*a* leaving as a cutout that is not opposite to the first magnet portion 21, and the side of the fourth magnet portion 24 in the Y direction of the second magnet portion 22 is shorter than the third magnet portion 23 with a second space 101*b* leaving as a cutout that is not opposite to the third magnet portion 23.

Figure 3:
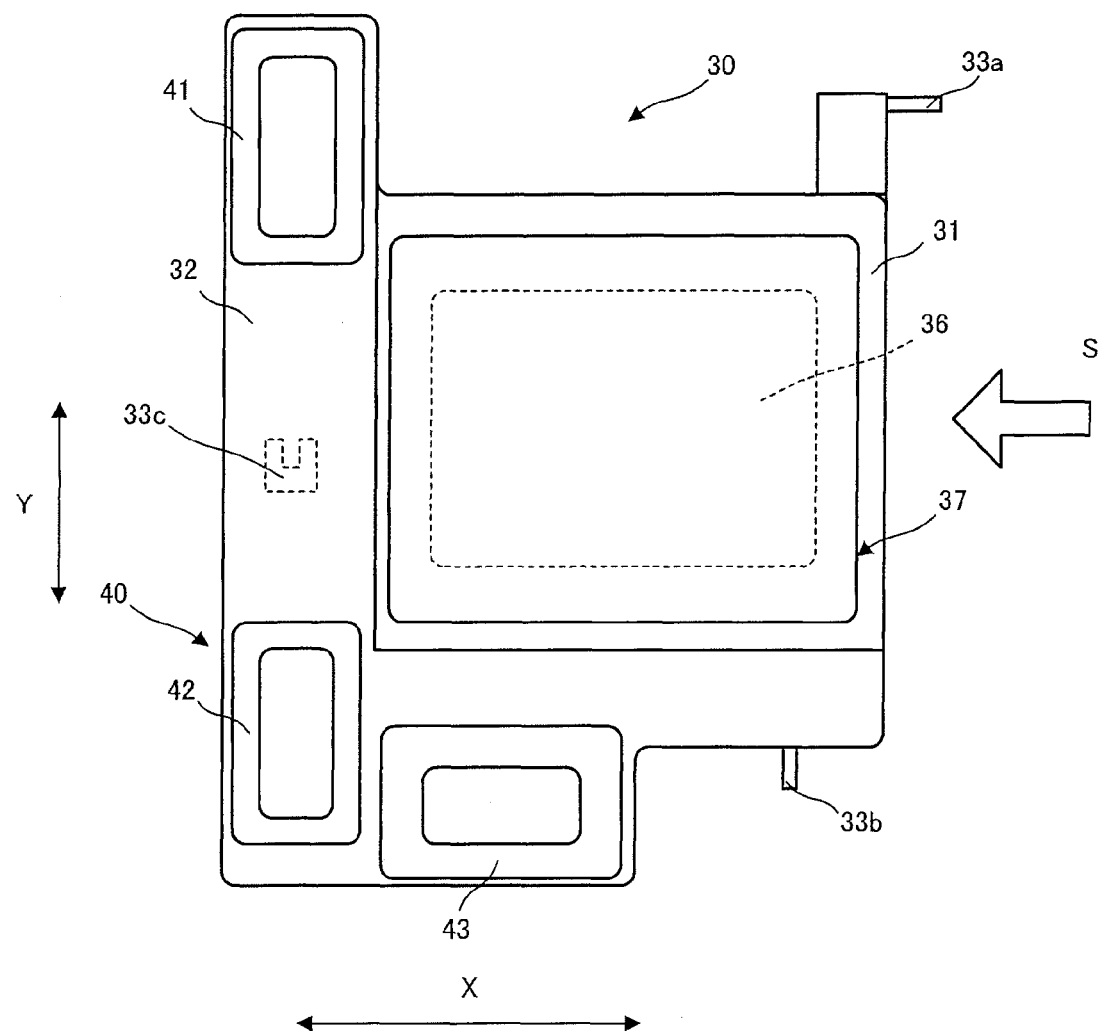
FIG. 3 is illustrative of the moving part 30.
Figure 4:
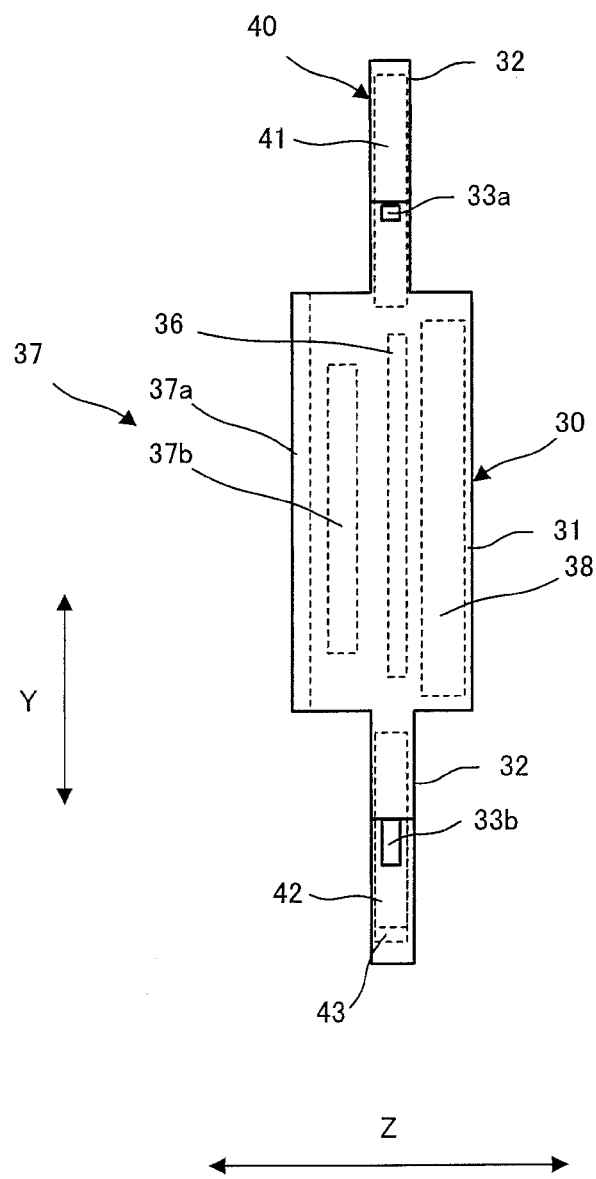
FIG. 4 is an illustration of FIG. 3 as viewed from Arrow S.

FIG. 3 is illustrative of the moving part 30, and FIG. 4 is an illustration of FIG. 3 as viewed from Arrow A.

The moving part 30 comprises a moving body 31 formed of a nonmagnetic material such as an aluminum alloy or synthetic resin, a coil housing 32 provided on a part of the circumference of the moving body 31, and a second assembly of spring supports 33*a*, 33*b* and 33*c* for supporting springs (not shown) to support the moving part 30 on the base part 10 in a movable manner.

Here the X direction is defined as a first direction to the moving part 30, and the Y direction is defined as a second direction orthogonal to the X direction, as depicted in FIG. 3.

The moving body 31 includes an imaging device 36 for photoelectric conversion of light, a filter group 37 and an electric device 38 mounted on it. The filter group 37 comprises an ultrasonic filter 37*a* and an infrared cut filter 37*b* as viewed from its side away from the imaging device 36. On the side of the filter group 37 opposite to the imaging device 36 there is an electric device 38 mounted to detect the quantity of light received at the imaging device and process image signals or the like based on that quantity of light received.

The coil housing 32 is provided on a part of the circumference of the moving body 31 and has a recess for stowing the coil group 40. The moving body 31 is longer than the coil housing 32 in the Z direction orthogonal to the X and Y directions.

The coil group 40 comprises a first coil 41, a second coil 42 and a third coil 43. The first coil 41 is located in opposition to the first 21 and the second magnet portion 22 on the base part 10 shown in FIG. 2. The second coil 42 is located in such a way as to oppose to the third 23 and the fourth magnet portion 24 on the base part 10 shown in FIG. 2, and the third coil 43 is located in such a way as to oppose to the fourth 24 and the fifth magnet portion 25 on the base part 10 shown in FIG. 2.

Figure 5:
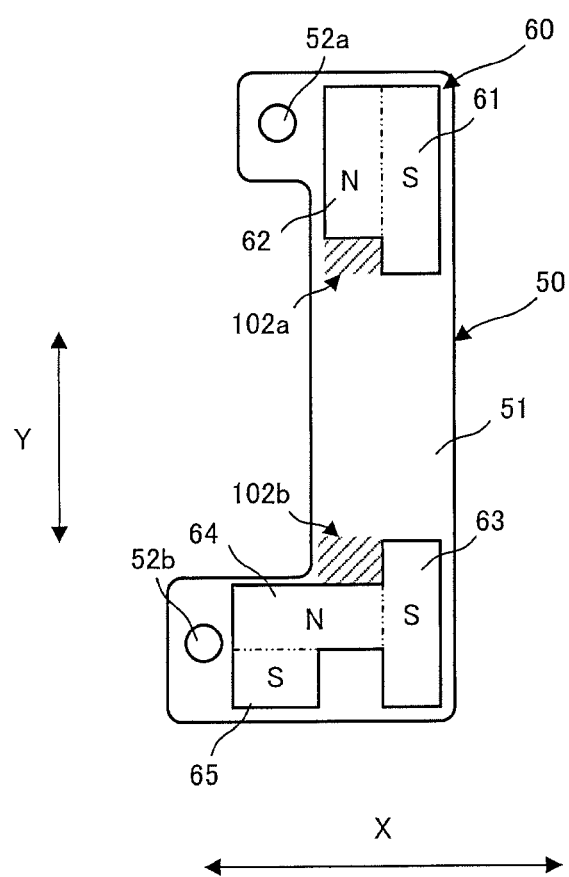
FIG. 5 is illustrative of the magnet support portion 50.

FIG. 5 is illustrative of the magnet support portion 50 of FIG. 1, as viewed from the moving part 30 side.

The magnet support portion 50 comprises a flat support body 51 formed of a magnetic material such as iron or an iron compound, and supporting through-holes 52*a* and 52*b* that are provided through the support body 51 for inserting screws (not shown) through it to support the magnet support portion 50 relative to the base body 10.

Here the X direction is defined as a first direction to the magnet support portion 50, and the Y direction is defined as a second direction orthogonal to the X direction, as shown in FIG. 4.

The second permanent magnet group 60 on the magnet support portion 50 comprises a first opposite magnet portion 61 that is S-polarized (magnetized) on the coil group 40 side, a second opposite magnet portion 62 that is opposite to the first opposite magnet portion 61 and N-polarized on the coil group 40 side, a third opposite magnet portion 63 that is located away from the first opposite magnet portion 61 in the Y direction and S-polarized on the coil group 40 side, a fourth opposite magnet portion 64 that is opposite to the third opposite magnet portion 63 in the X direction and N-polarized on the coil group 40 side, and a fifth opposite magnet portion 65 that is in opposition to the fourth magnet portion 64 in the Y direction and S-polarized on the coil group 40 side. Note here that the first 61 to the fifth opposite magnet portion 65 are oppositely magnetized on the coil group 40 side and the opposite side.

The side of the fourth opposite magnet portion 64 in the Y direction of the second opposite magnet portion 62 has a cutout and is shorter than the first opposite magnet portion 61, with a third space 102*a* serving as a cutout that is not in opposition to the first opposite magnet portion 61, and the side of the second opposite magnet portion 62 in the Y direction of the fourth opposite magnet portion 64 has a cutout and is shorter than the third opposite magnet portion 63, with a fourth space 102*b* serving as a cutout that is not in opposition to the third opposite magnet portion 63.

Figure 6:
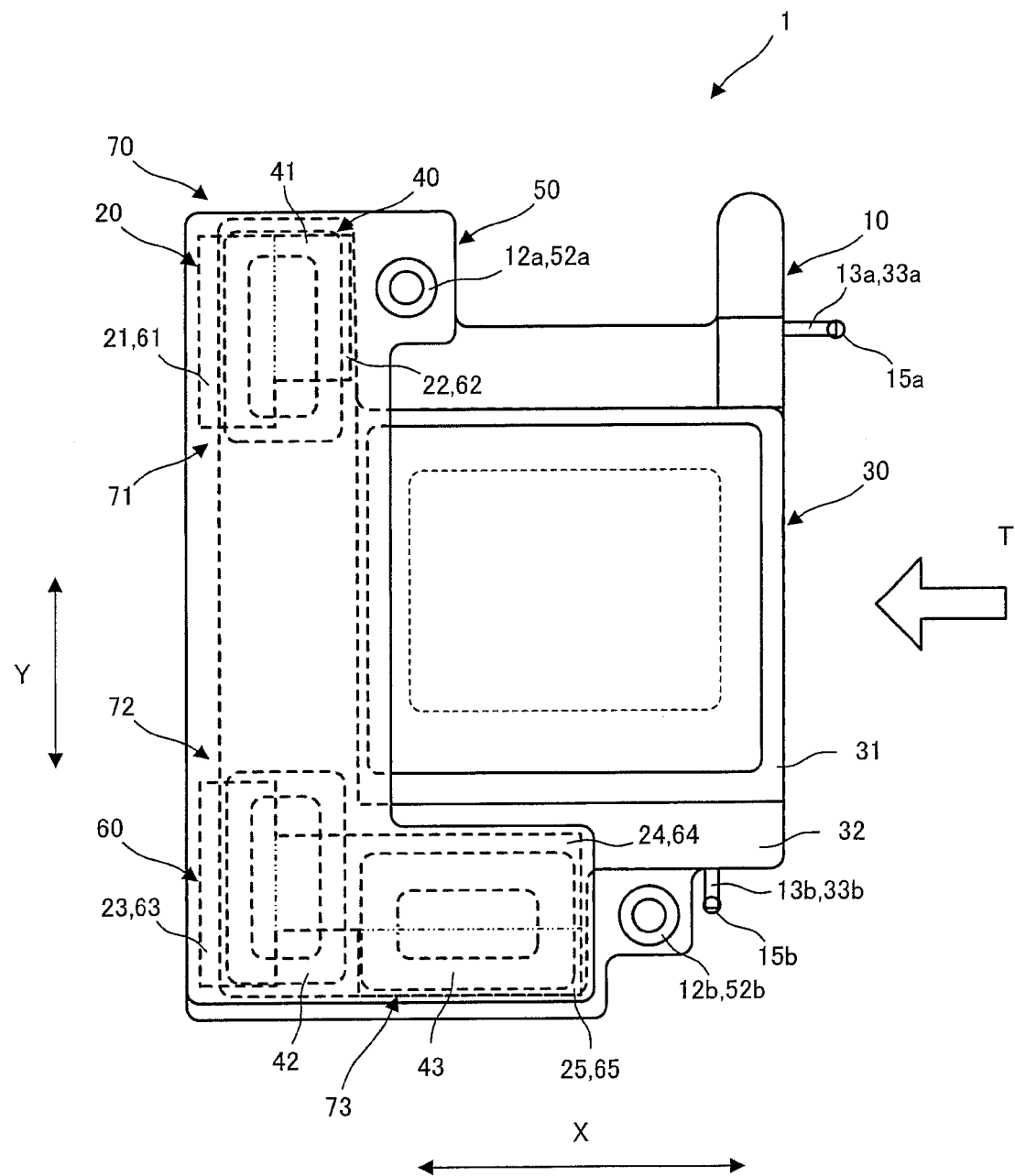
FIG. 6 is illustrative of the image-shake correction apparatus 1 assembled according to the first embodiment of the invention.
Figure 7:
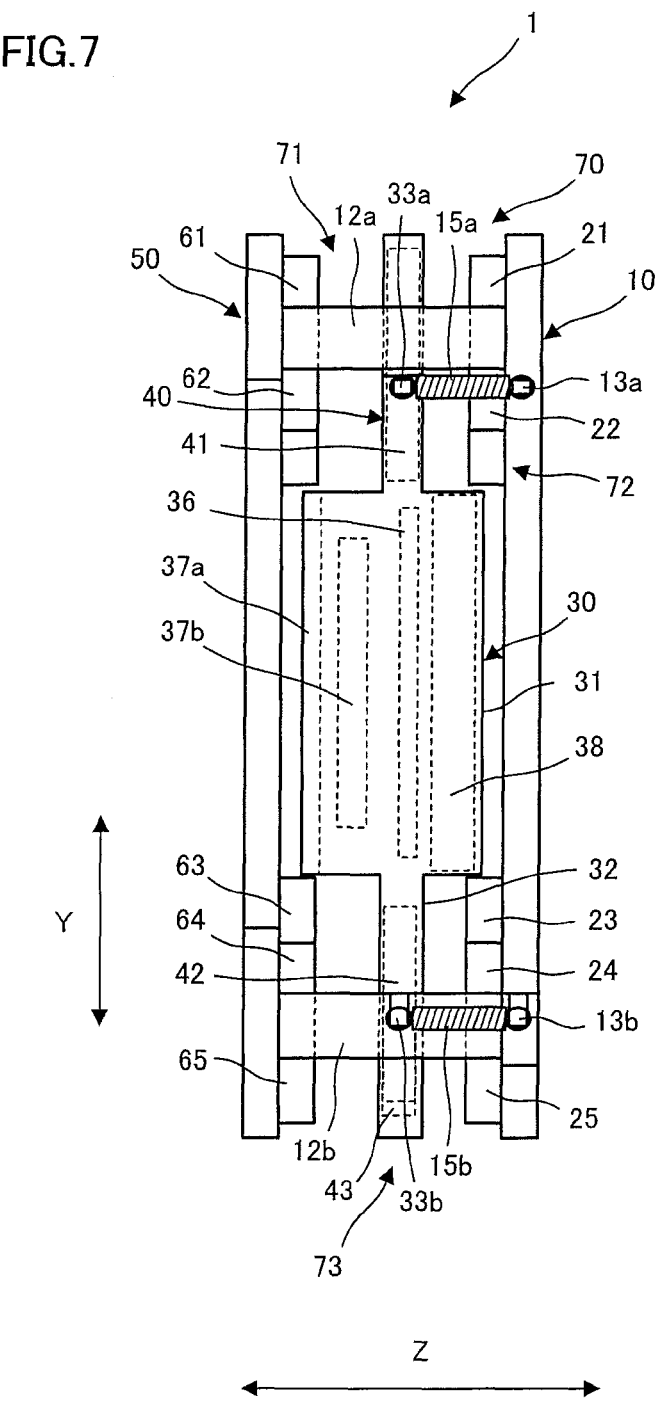
FIG. 7 is an illustration of FIG. 6 as viewed from Arrow T.

FIG. 6 is illustrative of the image-shake correction apparatus 1 assembled according to the first embodiment of the invention, and FIG. 7 is an illustration of FIG. 6 as viewed from Arrow T.

To assemble the image-shake correction apparatus 1 according to the first embodiment of the invention, screws (not shown) are inserted through the supporting through-holes 12*a* and 12*b* in the base part 10 shown in FIG. 1 and the threaded through-holes 52*a* and 52*b* in the magnet support portion 50, and the support body 51 of the magnet support portion 50 is supported by a plate 41 attached to the base body 11 of the base part 10. Consequently, the support body 51 is firmly supported on the base body 11 at three sites: supporting through-holes 12*a* and 12*b* and plate 14. In addition, coil springs 15*a*, 15*b* and 15*c* are 5 mounted on the first spring supports 13*a*, 13*b* and 13*c* of the base part 10, and on the second spring supports 33*a*, 33*b* and 33*c* of the moving part 30, respectively.

Preferably, the base part 10 and moving part 30 are supported in a fashion generally called the ball support wherein they are supported by a plurality of spherical balls (not shown) held between them. As the spherical balls roll, it enables the moving part 30 to move relative to the base part 10.

With the image-shake correction apparatus 1 assembled in place, the first permanent magnet group 20 of the base part 10 is opposite to, and away from, the second permanent magnet group 60 of the magnet support portion 50. In a space between the first permanent magnet group 20 and second permanent magnet group 60, there is a magnetic field generated in a space between the magnets because the they are oppositely magnetized. Then, the coil group 40 of the moving part 30 is located in a discrete space having the magnetic field generated in it. Such arrangement of the first permanent magnet group 20, second permanent magnet group 60 and coil group 40 allows for formation of a voice coil motor 70.

In the first embodiment of the invention, the first and second magnet portions 21 and 22, first coil 41 and first and second opposite magnet portions 61 and 62 are combined together into a first X-direction voice coil motor 71 operating as a first voice coil motor for moving the moving part 30 in the X direction defined as the first direction, and the third and fourth magnet portions 23 and 24, second coil 42 and third and fourth opposite magnet portions 63 and 64 are combined together into a second X-direction voice coil motor 72 operating as a first voice coil motor for moving the moving part 30 in the X direction defined as the first direction. Further, the fourth and fifth magnet portions 24 and 25, third coil 43 and fourth and fifth opposite magnet portions 64 and 65 are combined together into a Y-direction voice coil motor 73 operating as a second voice coil motor for moving the moving part 30 in the Y direction defined as the second direction. The number of turns of the first 41, the second 42 and the third coil 43 may then vary depending on the respective cutouts.

Consequently, the fourth magnet portion 24 and the fourth opposite magnet portion 64 will be included in both the second X-direction voice coil motor 72 and Y-direction voice coil motor 73. Thus, at least one magnet portion in the first and second magnet groups 20 and 21 is set up in such a way as to be included in both the X- and Y-direction voice coil motors 72 and 73 to have a dual function of moving the moving part 30 in the X and Y directions. This will contribute to a parts count reduction, and make it possible to reduce the size and cost of the apparatus.

In the embodiment of the invention here, as electric currents flow through the first and second coils 41 and 42, it causes the moving part 30 to move in the X direction, and as an electric current flows through the third coil 43, it causes movement of the moving part 30 in the Y direction.

Figure 8:
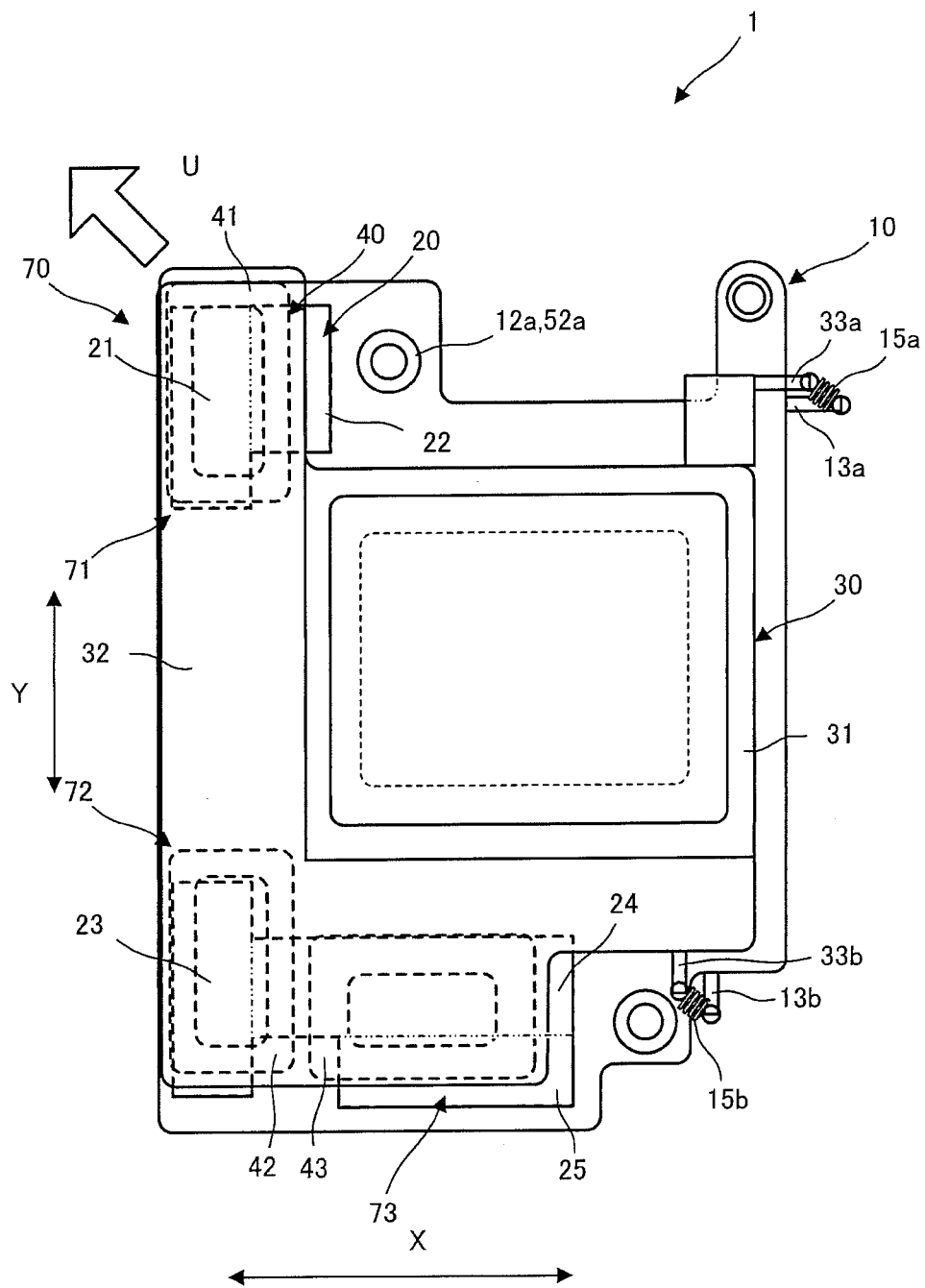
FIG. 8 is illustrative of the operation of the image-shake correction apparatus 1 assembled according to the first embodiment of the invention.
Figure 9:
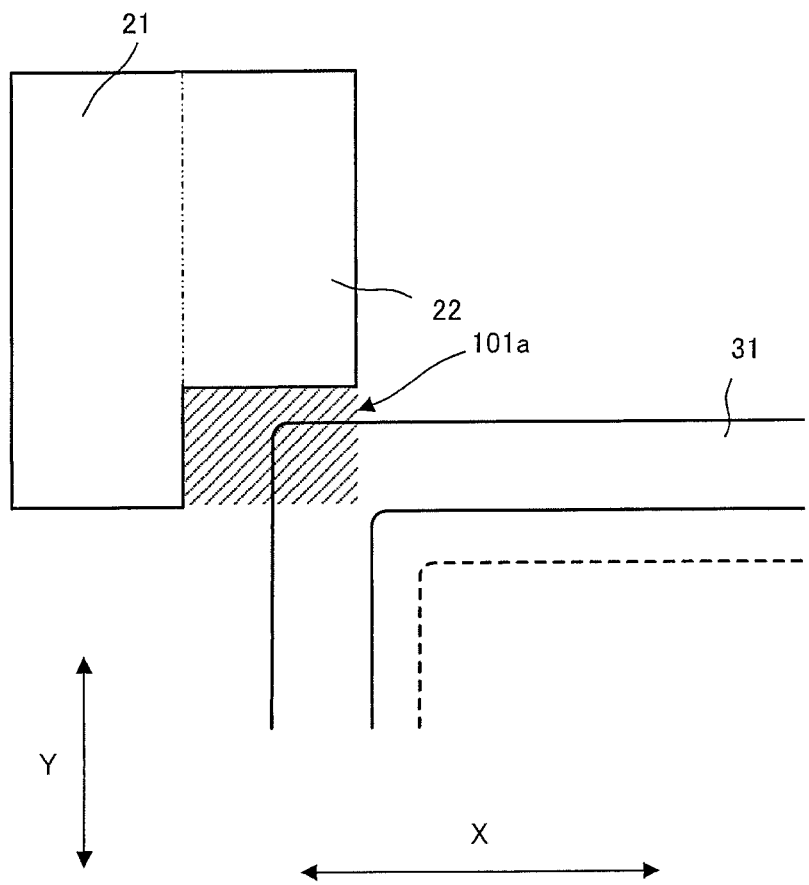
FIG. 9 is an enlarged view of a part of FIG. 8.

FIG. 8 is illustrative of the operation of the image-shake correction apparatus 1 assembled according to the first embodiment of the invention, and FIG. 9 is an enlarged view of a part of FIG. 8. It is here to be noted that the magnet support portion 50 is left out of FIG. 8 for the purpose of making movement of the moving part 30 more visible, and only the first and second magnet portions 21 and 22 are shown together with the moving body 31 in FIG. 9.

As shown typically in FIG. 8, suppose now that the moving part 30 moves relative to the base part 10 in a direction indicated by Arrow U. Thereupon, the moving body 31 comes closer to the first and second magnet portions 21 and 22. If the Y-direction length of the second magnet portion 22 is the same as the Y-direction length of the first magnet portion 21, then the moving 25 body 31 will interfere with the second magnet portion 22.

With the first space 101a defined by a cutout formed by making the Y-direction length of the second magnet portion 22 shorter than the Y-direction length of the first magnet portion 21, it is then possible to avoid interference of the moving body 31 with the second magnet portion 22, thereby reducing the size of the apparatus without narrowing down the moving range of the moving part 30. It is here to be noted that if the first and second spaces 101a and 101b serving as cutouts are positioned in the central direction side of the base part 10 or moving part 30, the apparatus could be further reduced in size, or if the cutouts are positioned in a position where they overlap at least a part of the range wherein the moving part 30 is movable by the voice coil motor 70, the apparatus could be even further reduced in size.

It is here to be noted that if other magnet portion is provided with a cutout too, it is then possible to avoid interference of the moving body 31 with that magnet portion or interference of that magnet portion with other member, thereby reducing the size of the apparatus without narrowing down the moving range of the moving part 30.

While the embodiment of the invention here is explained with reference to a specific arrangement having permanent magnet groups in both the base part and the magnet support portion 50, it is to be understood that only one of them may include permanent magnet groups provided that there is an output capable of moving the moving part 30.

The permanent magnet is here explained.

Figure 10:
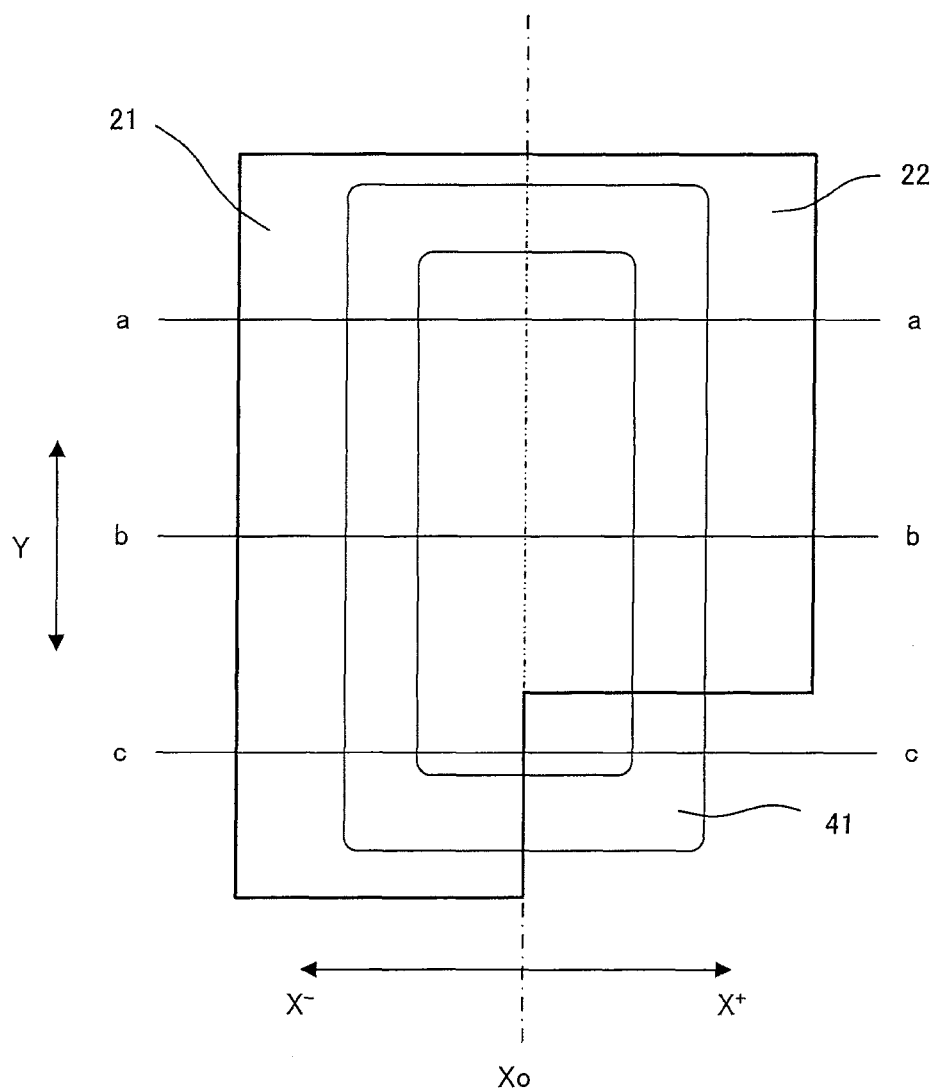
FIG. 10 is illustrative of a reference example of the first and second magnet portions 21 and 22 and the first coil 41.
Figure 11A:
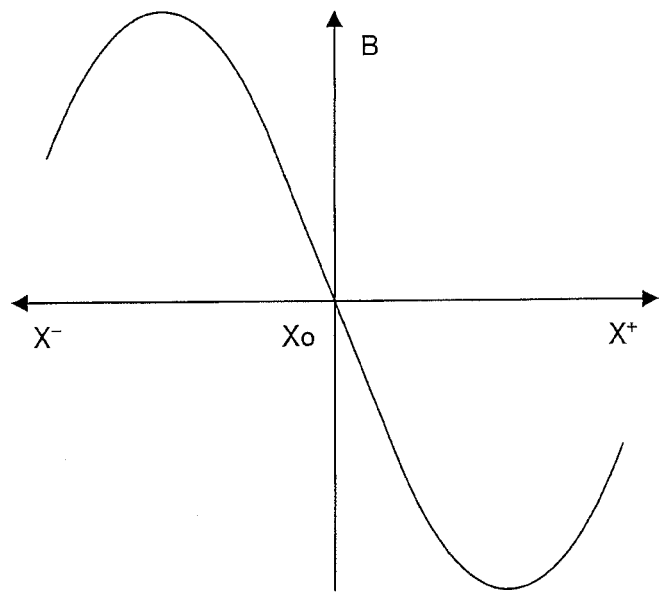
FIGS. 11A and 11B are indicative of magnetic flux densities in section of the reference example shown in FIG. 10.
Figure 11B:
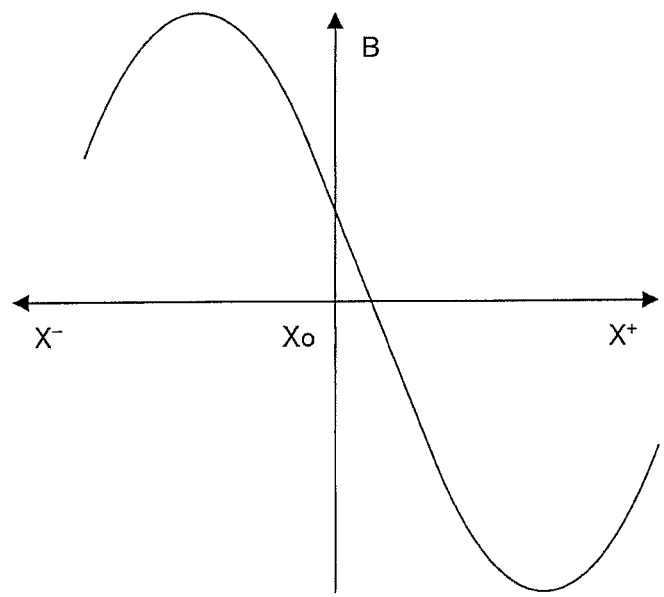
Figure 12:
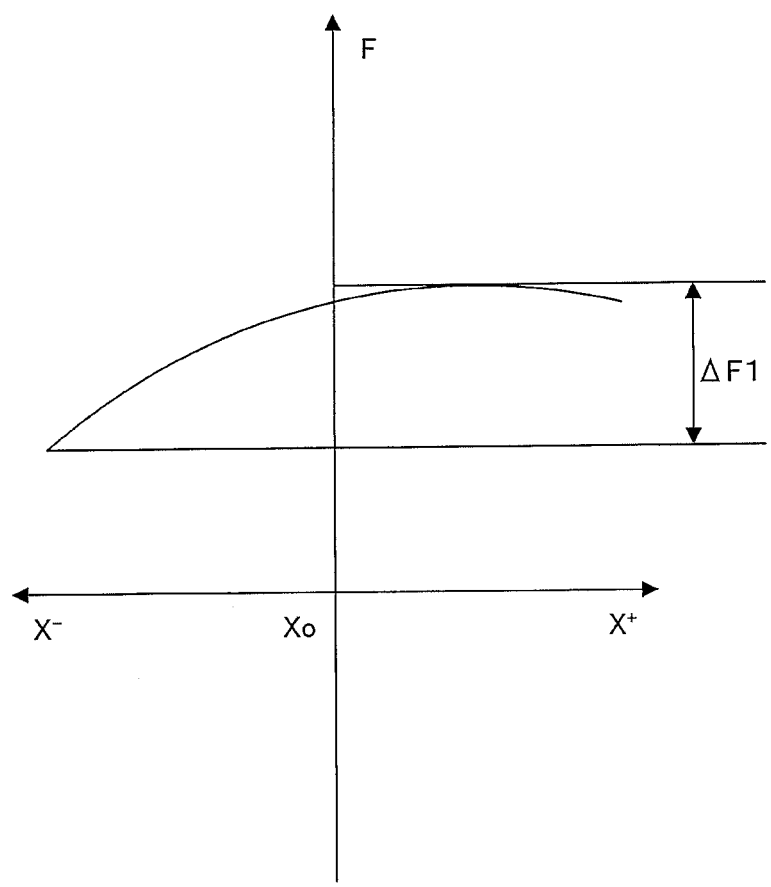
FIG. 12 is illustrative of driving forces upon movement of the coils of the reference example.

FIG. 10 is illustrative of a reference example of the first and second magnet portions 21 and 22 and the first coil 41, FIGS. 11A and 11B are indicative of a magnetic flux density generated in a space passing through the coil 41 in section of the reference example shown in FIG. 10, and FIG. 12 is indicative of a driving force upon movement of the coil in the reference example of FIG. 12. More specifically, FIG. 11A is indicative of magnetic flux densities in Sections a-a and b-b, respectively, and FIG. 11B is indicative of a magnetic flux density in Section cc.

According to the embodiment of the invention here, size reductions are achievable by defining a voice coil motor 7 by the first and second permanent magnet groups 20 and 60, each having a cutout, and a coil group 40.

Typically in Sections a-a and b-b having no cutout, a magnetic flux density B generated at the first and second magnet portions 21 and 22 is distributed symmetrically about the center Xo of the X direction of the first coil 41, as depicted in FIG. 11A. In Section c-c having the cutout, however, the magnetic flux density B will be distributed asymmetrically about the center Xo of the X direction of the first coil 41 with a shift of the position where the magnetic flux density B becomes zero from the center Xo, as depicted in FIG. 11B.

For this reason, upon movement of the first coil 41 from Xo there is a difference in driving force F between its movements in the directions indicated by Arrows $X^+$ and $X^-$ in FIG. 10, which difference makes the driving force F asymmetric depending on the direction of movement upon movement of the first coil 41, as depicted in FIG. 12, resulting in a large width-of-change $\Delta F1$ in the driving force F. This will often affect controllability.

In the first embodiment of the invention, therefore, the center Xo of the X direction of the first coil 41 is offset on the side of the second magnet portion 22 shorter in the Y direction because of having the cutout with respect to a demarcation line V between the first and second magnet portions 21 and 22.

Figure 13:
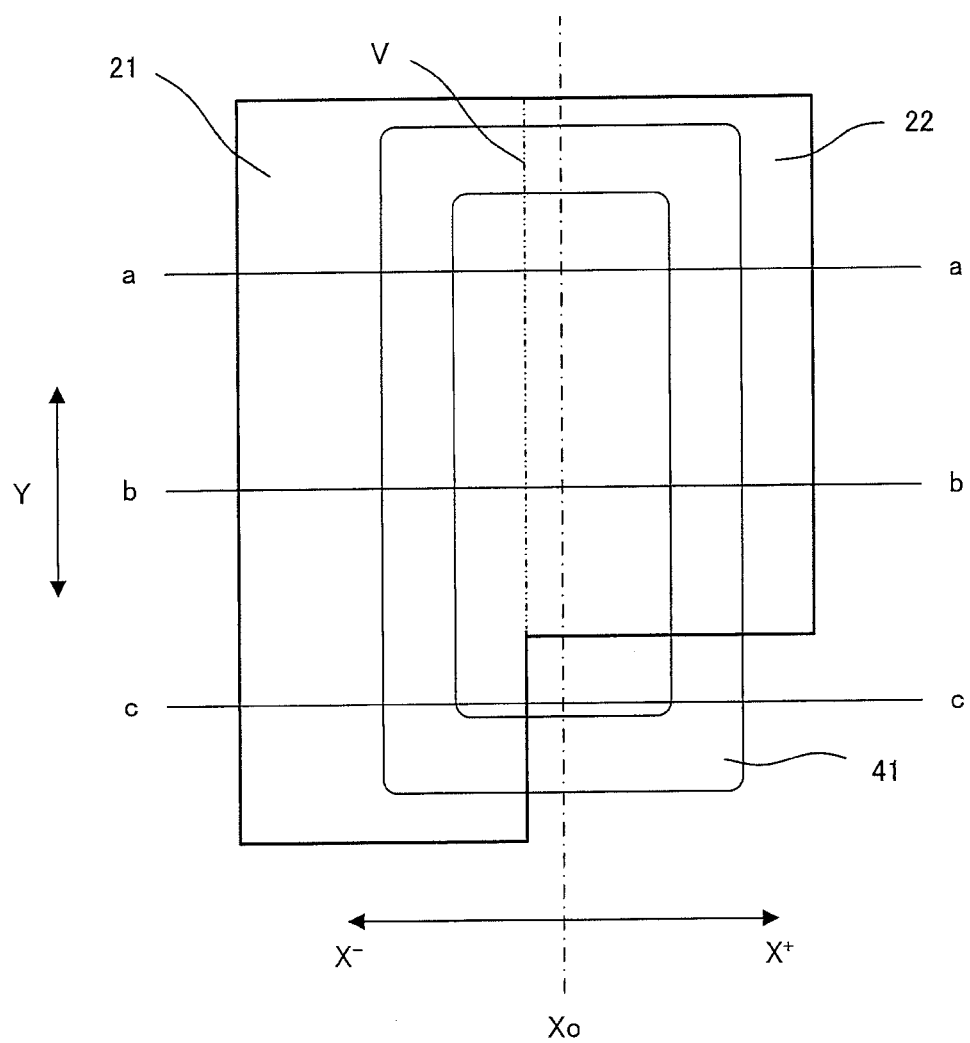
FIG. 13 is illustrative of the first and second magnet portions 21 and 22 and the first coil 41 according to the first embodiment of the invention.
Figure 14A:
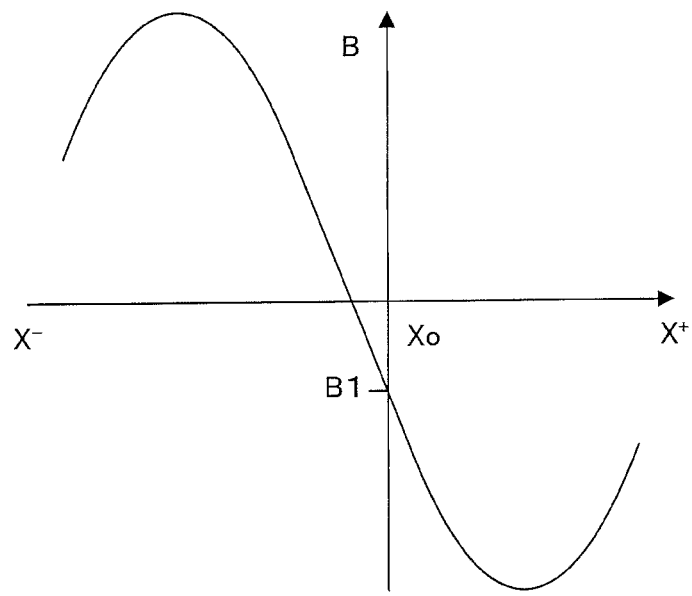
FIGS. 14A and 14B are indicative of magnetic flux densities in section of the first embodiment shown in FIG. 13.
Figure 14B:
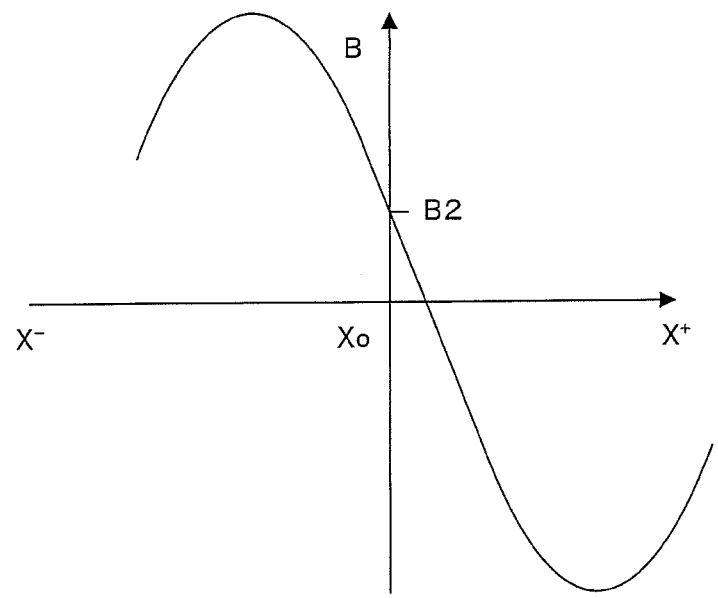
Figure 15:
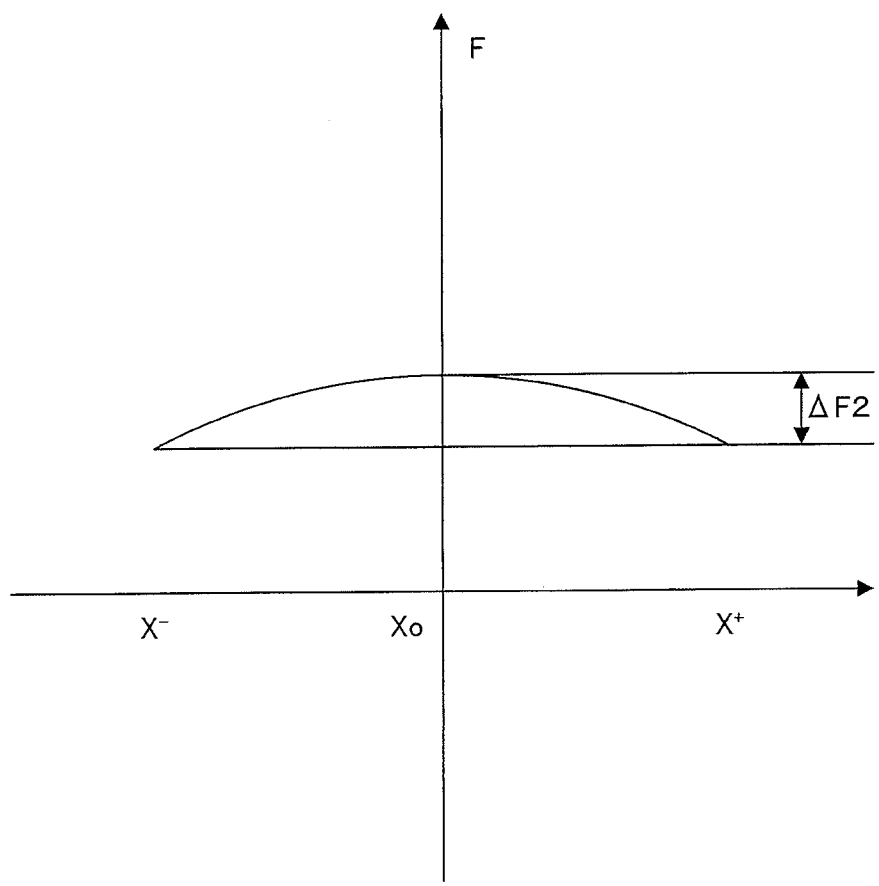
FIG. 15 is indicative of driving forces upon movement of the coils according to the first embodiment of the invention.

FIG. 13 is illustrative of the first and second magnet portions 21 and 22 and the first coil 41 in the first embodiment of the invention, FIGS. 14A and 14B are indicative of a magnetic flux density in section of the first embodiment of the invention depicted in FIG. 13, and FIG. 15 is indicative of a driving force upon movement of the coil in the first embodiment of the invention. More specifically, FIG. 14A is indicative of magnetic flux density distributions in Sections a-a and b-b, and FIG. 14B is indicative of a magnetic flux density in Section cc.

In Sections a-a and b-b having no cutout, a magnetic flux density B generated at the first and second magnet portions 21 and 22 is distributed asymmetrically about the center Xo of the X direction of the first coil 41 as depicted in FIG. 14A, where the position at which the magnetic flux density B becomes zero is offset from the center Xo toward the $X^-$ side. In Section c-c having a cutout, on the other hand, the magnetic flux density B is distributed asymmetrically about the center Xo of the X direction of the first coil 41 as depicted in FIG. 14B, where the position at which the magnetic flux density B becomes zero is offset from the center Xo toward the $X^+$ side. However, the position at which the magnetic flux density B becomes zero is offset on the $X^-$ side in the section part having no cutout in the X direction and on the $X^-$ side in the section part having the cutout in the X direction. In the center Xo of the first coil 41, therefore, the first and second magnet portions 21 and 22 are adjusted such that the sum of a magnetic flux density B1 in the section part having no cutout in the X direction and a magnetic flux density B2 in the section part having the cutout in the X direction becomes 0.

Upon movement of the first coil 41 from Xo, therefore, the driving force F for movement toward the $X^+$ and $X^-$ sides attains symmetry, ensuring that the width-of-change $\Delta F2$ in the driving force F gets smaller than the width-of-change $\Delta F1$ of the reference example. It is thus possible to achieve operation of good controllability with stable driving force.

It is here to be noted that the first and second magnet portions 21 and 22 is more preferably adjusted such that the sum of all the magnetic flux densities B1 throughout the section part having no cutout in the X direction and all the magnetic flux densities B2 throughout the section part having the cutout in the X direction becomes zero.

While the invention has been explained with reference to a specific embodiment wherein the first and second magnet portions 21 and 22 have the same length in the X direction, it is to be understood that they may be adjusted such that the lengths of the first and second magnet portions 21 and 22 differ, allowing the sum of the magnetic flux densities B1 and B2 to become zero.

The technical idea of the first embodiment of the invention may also be applied to the relations between the second coil 42 and the third and fourth magnet portions 23 and 24, between the second coil 42 and the third and fourth opposite magnet portions 63 and 64, between the third coil 43 and the fourth and fifth magnet portions 24 and 25, and between the third coil 43 and the fourth and fifth opposite magnet portions 64 and 65.

In the second embodiment of the invention, the residual magnetic flux density that is one property of a magnet may be varied whereby the first and second magnet portions are adjusted such that in the center Xo of the first coil 41, the sum of the magnetic flux density B1 in a section part having no cutout in the X direction and the magnetic flux density B2 in a section part having the cutout in the X direction becomes zero so that the driving force F upon movement toward the $X^+$ and $X^-$ sides an get symmetric and so the width-of-change in the driving force F can get small.

For instance, the first and second magnet portions 21 and 22 may be formed of different magnetic materials. If a samarium-cobalt magnet having a lower residual magnetic flux density is used for the first magnet 21 and a neodymium magnet higher in residual magnetic flux density than the first magnet portion 21 is used for the second magnet portion 22, it is then possible to gain more unerring control of movement of the first coil 40. This may also hold with the third magnet portion 23 and the fourth magnet portion 24, the first opposite magnet portion 61 and the second opposite magnet portion 62, and the third opposite magnet portion 63 and the fourth opposite magnet portion 64. Preferably in this case, the fifth magnet portion 25 and the fifth opposite magnet portion have the same residual magnetic flux densities as those of the fourth magnet portion 24 and the fourth opposite magnet portion 64.

It is also more preferable that the first and second magnet portions 21 and 22 are adjusted such that the sum of all magnetic flux densities B1 throughout the section part having no cutout in the X direction and all magnetic flux densities B2 throughout the section part having the cutout in the X direction becomes zero.

The technical idea of the second embodiment of the invention may also be applied to the relations between the second coil 42 and the third and fourth magnet portions 23 and 24, between the second coil 42 and the third and fourth opposite magnet portions 63 and 64, between the third coil 43 and the fourth and fifth magnet portions 24 and 25, and between the third coil 43 and the fourth and fifth opposite magnet portions 64 and 65.

In the third embodiment of the invention, the first and second magnets 21 and 22 may be of different magnet grades, and they may be adjusted such that in the center Xo of the first coil 41, the sum of the first magnetic flux density B1 in a section part having no cutout in the X direction and the second magnetic flux density B2 in a section part having the cutout in the X direction becomes zero so that the driving force F upon movement toward the $X^+$ and $X^-$ sides can get symmetric and the width-of-change in the driving force F can get small.

For instance, a neodymium magnet having a lower residual magnetic flux density of about 1.3T is used for the first magnet portion 21 and a neodymium magnet having a residual magnet flux density of about 1.4T higher than that of the first magnet portion 21 is used for the second magnet portion 22, it is then possible to gain more unerring control of movement of the first coil 40. This may also hold with the third magnet portion 23 and the 20 fourth magnet portion 24, the first opposite magnet portion 61 and the second opposite magnet portion 62, and the third opposite magnet portion 63 and the fourth opposite magnet portion 64. Preferably in this case, the fifth magnet portion 25 and the fifth opposite magnet portion 65 have the same residual magnetic flux densities as those of the fourth magnet portion 24 and the fourth opposite magnet portion 64.

It is more preferred that the first and second magnet portions 21 and 22 are adjusted such that the sum of all magnetic flux densities B1 throughout the section part having no cutout in the X direction and all magnetic flux densities B2 throughout the section part having the cutout in the X direction becomes zero.

The technical idea of the third embodiment of the invention may also be applied to the relations between the second coil 42 and the third and fourth magnet portions 23 and 24, between the second coil 42 and the third and fourth opposite magnet portions 63 and 64, between the third coil 43 and the fourth and fifth magnet portions 24 and 25, and between the third coil 43 and the fourth and fifth opposite magnet portions 64 and 65.

While the $1^{st}$ to $3^{rd}$ embodiments of the invention have been explained, it is to be understood that they may be carried out in combination of two or three.

In the embodiment of the invention here, the first and second magnet portions 21 and 22 in the first 20 permanent magnet group 20 are magnetized as a single magnet; the third, fourth and fifth magnet portions 23, 24 and 25 in the first permanent magnet group 20 are magnetized as a single magnet; the first and second opposite magnet portions 61 and 62 in the second permanent magnet group 60 are magnetized as a single magnet; and the third, fourth and fifth opposite magnet portions 63, 64 and 65 in the second permanent magnet group 60 are magnetized as a single magnet. However, they may be magnetized as separate magnets or, alternatively, some of them may be magnetized as a separate magnet. Such separate magnetization could facilitate processing, and allow for simple low-cost production.

It is here to be noted that how to fix each permanent magnet to the base part 10 and magnet support portion 50 is not specifically limited: it may be fixed using adhesives, screwing, caulking or the like. In the embodiment of the invention here, an adhesive is typically used to fix the magnet to the base part 10 and magnet support portion 50.

Figure 16:
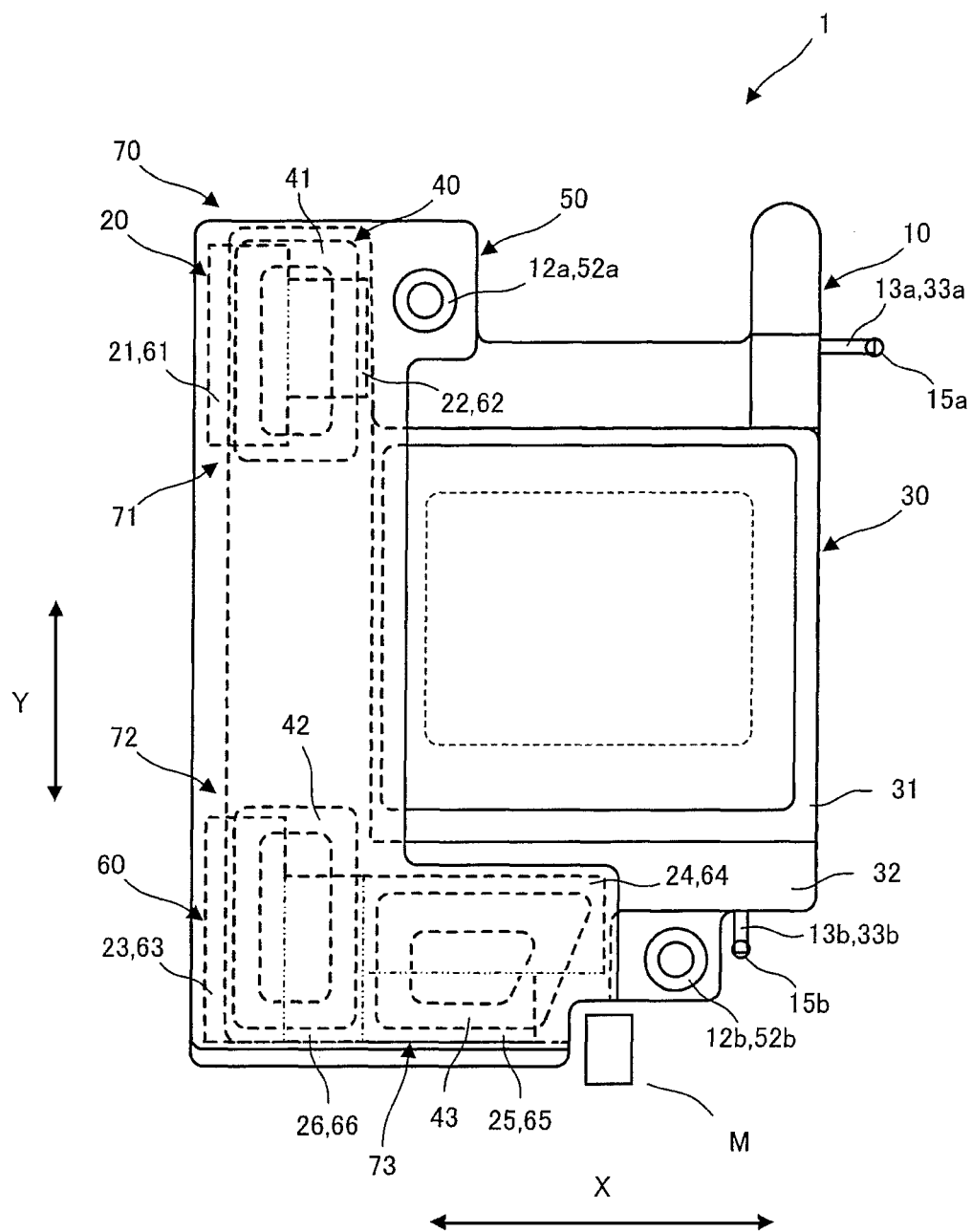
FIG. 16 is illustrative of the image-shake correction apparatus 1 assembled according to the fourth embodiment of the invention.

FIG. 16 is illustrative of the image-shake correction apparatus 1 assembled according to the fourth embodiment of the invention.

In the fourth embodiment of the invention, the first and second magnet portions 21 and 22, the first coil 41 and the first and second opposite magnet portions 61 and 62 form together a first X-direction voice coil motor 71 that works as a first voice coil motor for moving the moving part 30 in the first or X direction, and the third and sixth magnet portions 23 and 26, the second coil 42 and the third and sixth opposite magnet portions 63 and 66 form together a second X-direction voice coil motor 72 that works a first voice coil motor for moving the moving part 30 in the first or X direction. Further, the fourth and fifth magnet portions 24 and 25, the third coil 43 and the fourth and sixth opposite magnet portions 64 and 65 form together a Y-direction voice coil motor 73 that works as a second voice coil motor for moving the moving part 30 in the second or Y direction.

The third coil 43 in the Y-direction voice coil motor 73 is transformed in conformity to magnet length. Referring typically to the conformity of the fourth and fifth magnet portions 24 and 25 to the shape of the third coil 43, the third coil 43 assumes on a trapezoidal shape whose portion corresponding to the fourth magnet portion 24 gets longer and whose portion corresponding to the fifth magnet portion 25 gets shorter, as depicted in FIG. 16. The third coil 43 of a rectangular shape would interfere with other member M such as a tripod hole. Such interference of the fifth coil 45 with other member M may be avoided by allowing the shape of the third coil 43 to conform to the fourth and fifth magnet portions 24 and 25 and forming a portion corresponding to the cutout in the magnet as a coil s oblique side.

It is thus possible to allow the coil shape to conform to the length of the magnet portions and form the portions of the coil corresponding to the cutouts in the magnet portions as the coil s oblique sides thereby preventing any interference of the moving body 31 with other member M and, hence, achieving the size reduction of the apparatus without narrowing down the range of movement of the moving part 30.

Figure 17:
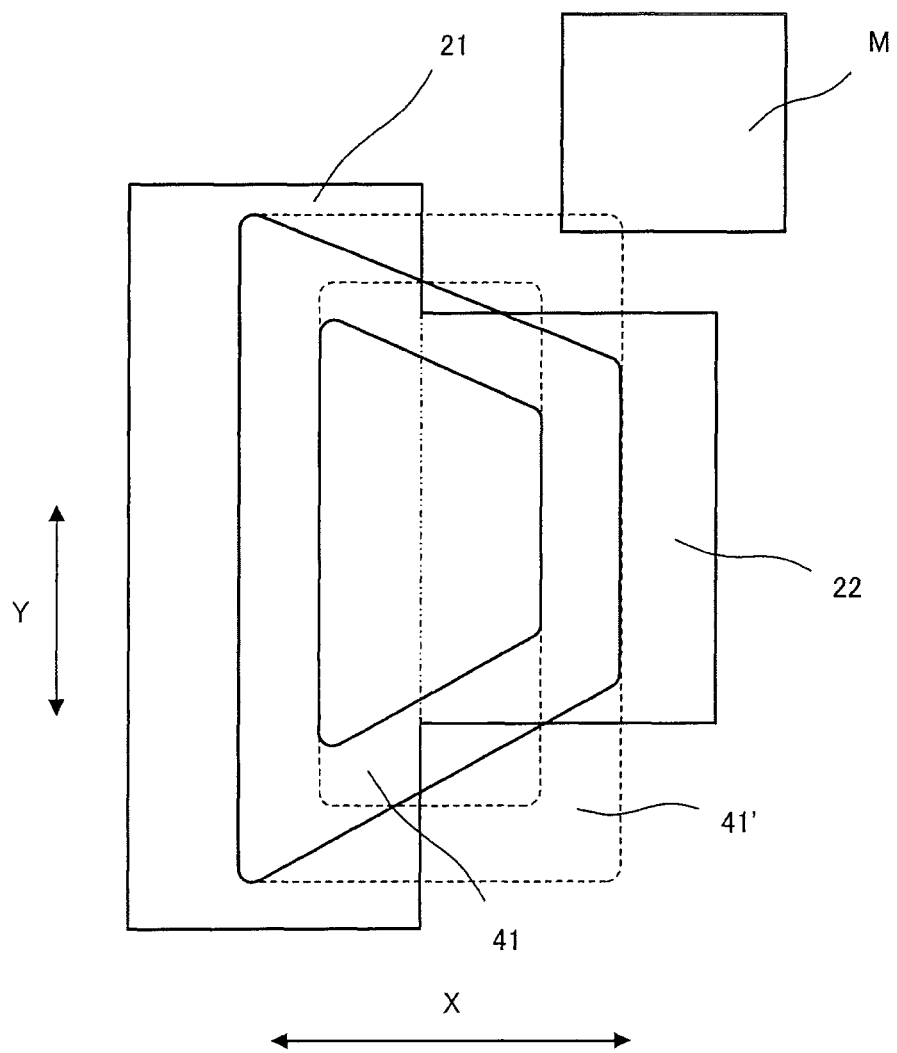
FIG. 17 is illustrative of magnet v. coil relations according to the fifth embodiment of the invention.

FIG. 17 is illustrative of what relations the magnets have to the coil in the fifth embodiment of the invention.

In the fifth embodiment of the invention, the coil is transformed in conformity to magnet length. Referring typically to the conformity of the shape of the first coil 41 to the first and second magnet portions 21 and 22, the first coil 41 assumes on a trapezoidal shape whose portion corresponding to the first magnet portion 21 gets longer and whose portion corresponding to the second magnet portion 22 gets shorter, as depicted in FIG. 17. Even though there is other member M present in a position that interferes with the first coil 41 before transformation, any interference of the first coil 41 with that other member M may be avoided by allowing the shape of the first coil 41 to conform to the first and second magnet portions 21 and 22 and forming the portion of the coil corresponding to the cutouts in the magnet portions as coil s oblique sides.

It is thus possible to allow the coil shape to conform to the length of the magnet portions and form the portions of the coil corresponding to the cutouts in the magnet portions as the coil s oblique sides thereby preventing any interference of the moving body 31 with other member M and, hence, achieving the size reduction of the apparatus without narrowing down the range of movement of the moving part 30.

The image-shake correction apparatus as described above may be used with electronic imaging apparatus, inter alia, a digital camera, a video camera or the like, as can be seen from the following exemplary embodiments.

FIG. 16 is illustrative of an imaging apparatus comprising the image-shake correction apparatus according to one embodiment of the invention, and FIG. 17 is illustrative of the image-shake correction apparatus, etc. within the imaging apparatus.

A digital camera 80 that is an imaging apparatus comprising the image-shake correction apparatus according to one embodiment of the invention comprises a camera body 81, and a lens unit 82 including an imaging lens L that is interchangeably mounted on the camera body 81, as shown in FIGS. 16 and 17.

It is here to be noted that an axis of light entering from the imaging lens L into the camera body 81 is indicated by O, and that the object side of the cameral body 81 with respect to the axis of incident light is called the front (front surface side) and the imaging side is called the rear (rear surface side). It is also to be noted that of directions orthogonal to the optical axis O, the horizontal direction as viewed from the front in an ordinary operation state is defined as the first or X direction, and the vertical direction is defined as the second or Y direction. The first or X direction and the second or Y direction correspond to the first or X direction and the second or Y direction with respect to the image-shake correction apparatus 1.

The camera body 81 comprises an outer casing 83 also serving as a camera proper that houses therein members forming the digital camera 80, and includes in a front position on the incident optical axis O a ring-like mount 84 for interchangeable mounting of the lens unit 82. On the left side as viewed from the front, the outer casing 83 is provided with a grip (not shown) held by the right hand of a camera operator during imaging operation. Located on top of the grip are various switches and 5 buttons (not shown) such as a release button.

Further, the camera body 81 comprises a battery chamber 92 for stowing away batteries 91 within the outer casing 83. In the rear of the battery chamber 92, there are a circuit board or the like (not shown) provided, including a control circuit for implementing control over the camera, image processing, compression processing, data storage processing or the like, and a memory such as SDRAM and a power source circuit, etc. Furthermore, the camera body 81 has a built-in shake-status detector (not shown) for that camera body which uses a gyro sensor (not shown) or the like as an example.

As shown in FIGS. 16 and 17, the camera body 81 further comprises a liquid crystal panel 86 having a panel display window on the rear surface side of the outer casing 83. This liquid crystal panel 86 is a TFT (thin-film transistor) type of rectangular display panel that is capable of not only displaying taken images but also showing as images various information pieces such as various settings and adjustments. On top of the outer casing 83, there is a hot shoe 87 located for attachment of an optical viewfinder, an electronic viewfinder, an external flash, a microphone, etc.

Within the outer casing 83 of the camera body 81, there are a focal plane shutter 88 and an imaging unit 89 received as shown in FIG. 16. The imaging unit 89 comprises an image-shake preventing apparatus 1 that supports an imaging device 36 such as a CCD and CMOS sensor on the XY plane in a displaceable fashion and uses a voice coil motor as an actuator. This image-shake preventing apparatus 1 operates in response to a shake signal from the above-mentioned shake detector to cancel out forces detected in the shake direction. The imaging device 36 includes a rectangular light-receiving plane having a long side along the X direction. The outer casing 83 is provided on its bottom surface with a tripod screw portion 90.

Figure 18:
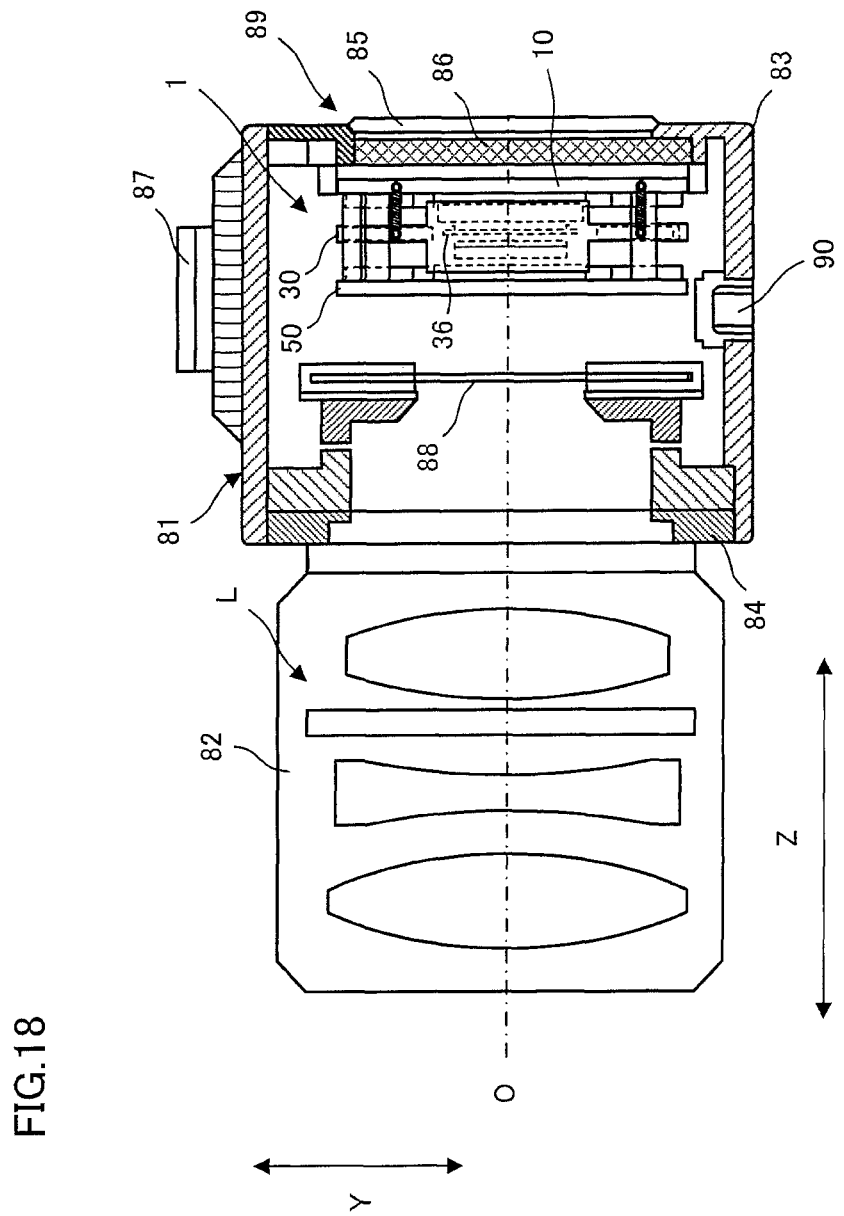
FIG. 18 is illustrative of an imaging apparatus comprising the image-shake correction apparatus according to a certain embodiment of the invention.

FIG. 18 is an enlarged view of the digital camera 80 in the vicinity of the tripod screw portion.

Upon mounting of the image-shake correction apparatus 1 to the digital camera 80, there is a possibility that it may interfere with the tripod screw portion 90. Such interference can be avoided if the X-direction lengths of the fourth and fifth magnet portions 64 and 65 differ from each other to receive the tripod screw portion 90 in the fifth space 103a as shown in FIG. 25 18.

Thus, upon attachment of the image-shake correction apparatus 1 to the digital camera 80, there is a possibility that the members within the digital camera 80 may interfere with the image-shake correction apparatus 1. This interference of the members within the digital camera 80 with the image-shake correction apparatus 1 can be avoided if the lengths of the magnet portions differ from each other to form the cutouts for receiving those members, thereby reducing the size of the digital camera 80.

Figure 19:
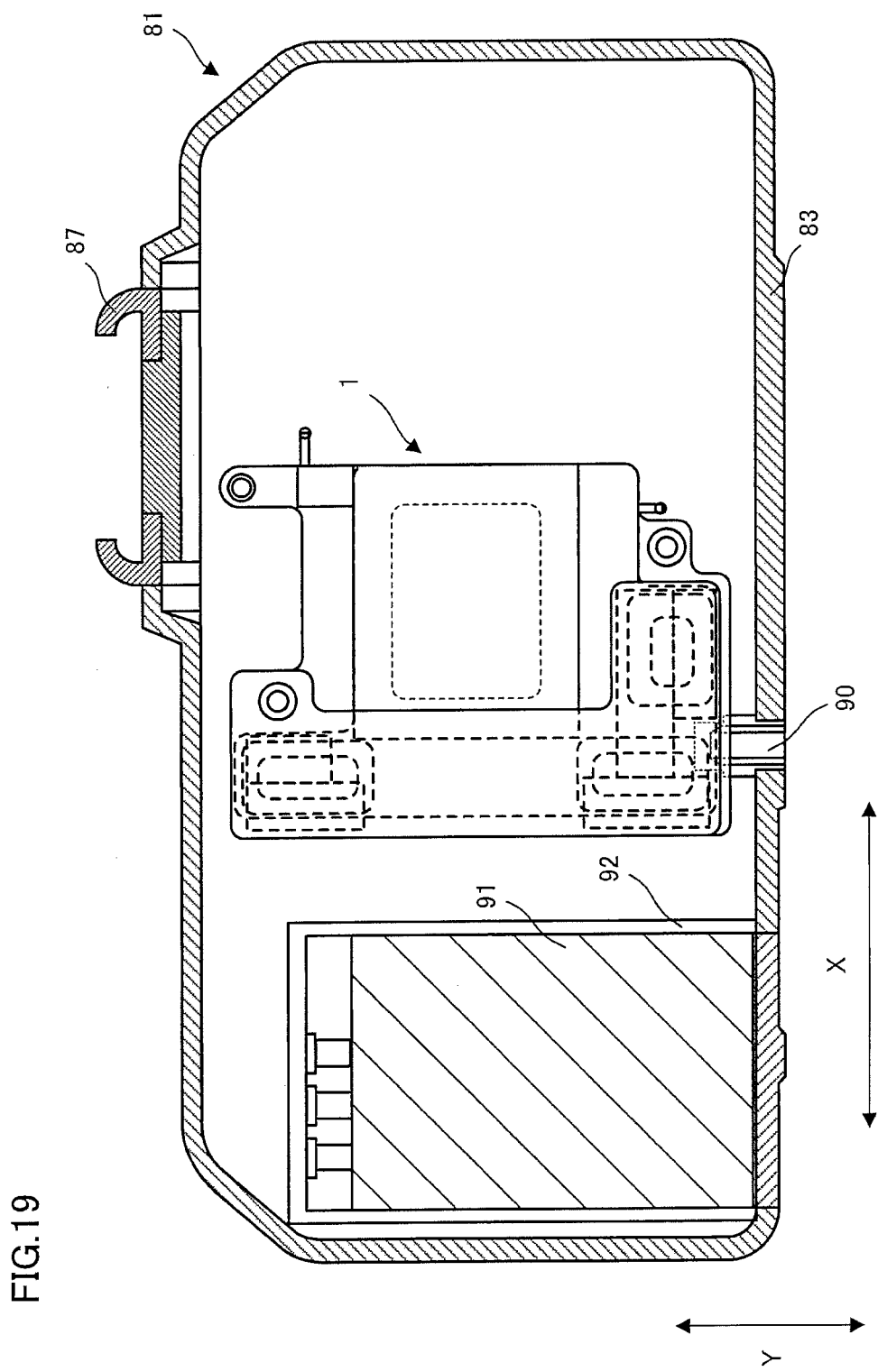
FIG. 19 is illustrative of the image-shake correction apparatus and so on in the imaging apparatus.
Figure 20:
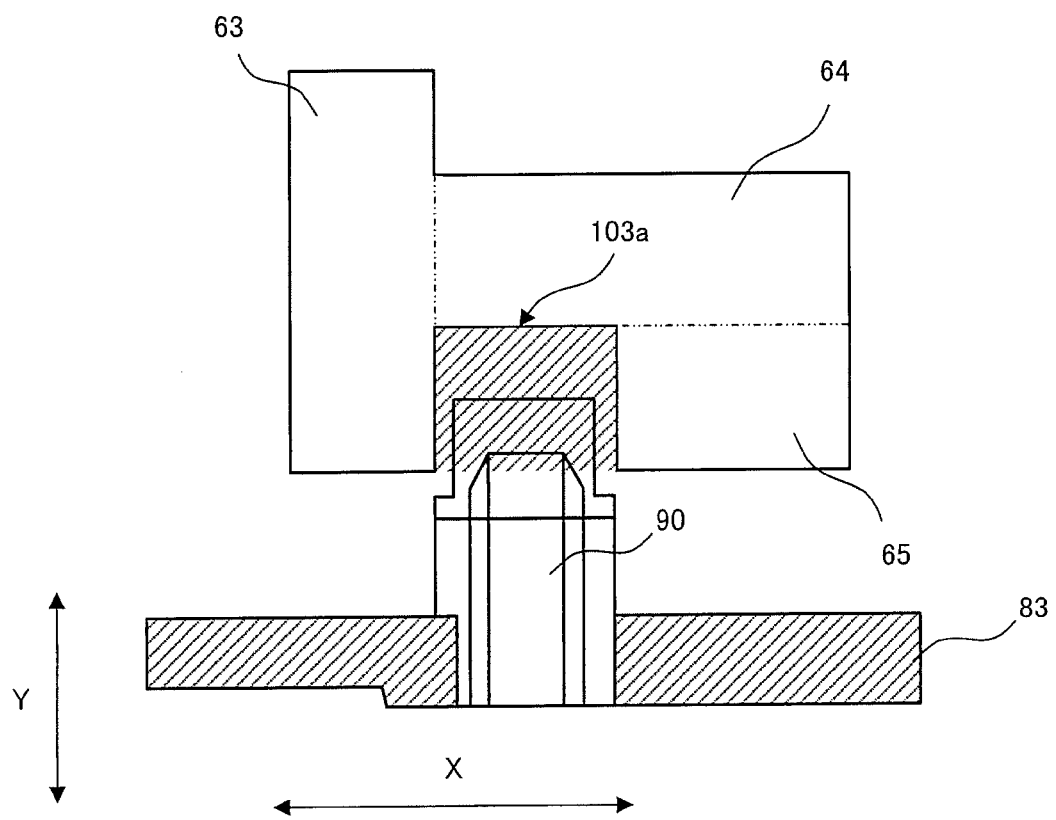
FIG. 20 is an enlarged view of a portion of the imaging apparatus around tripod screw portions.
Figure 21:
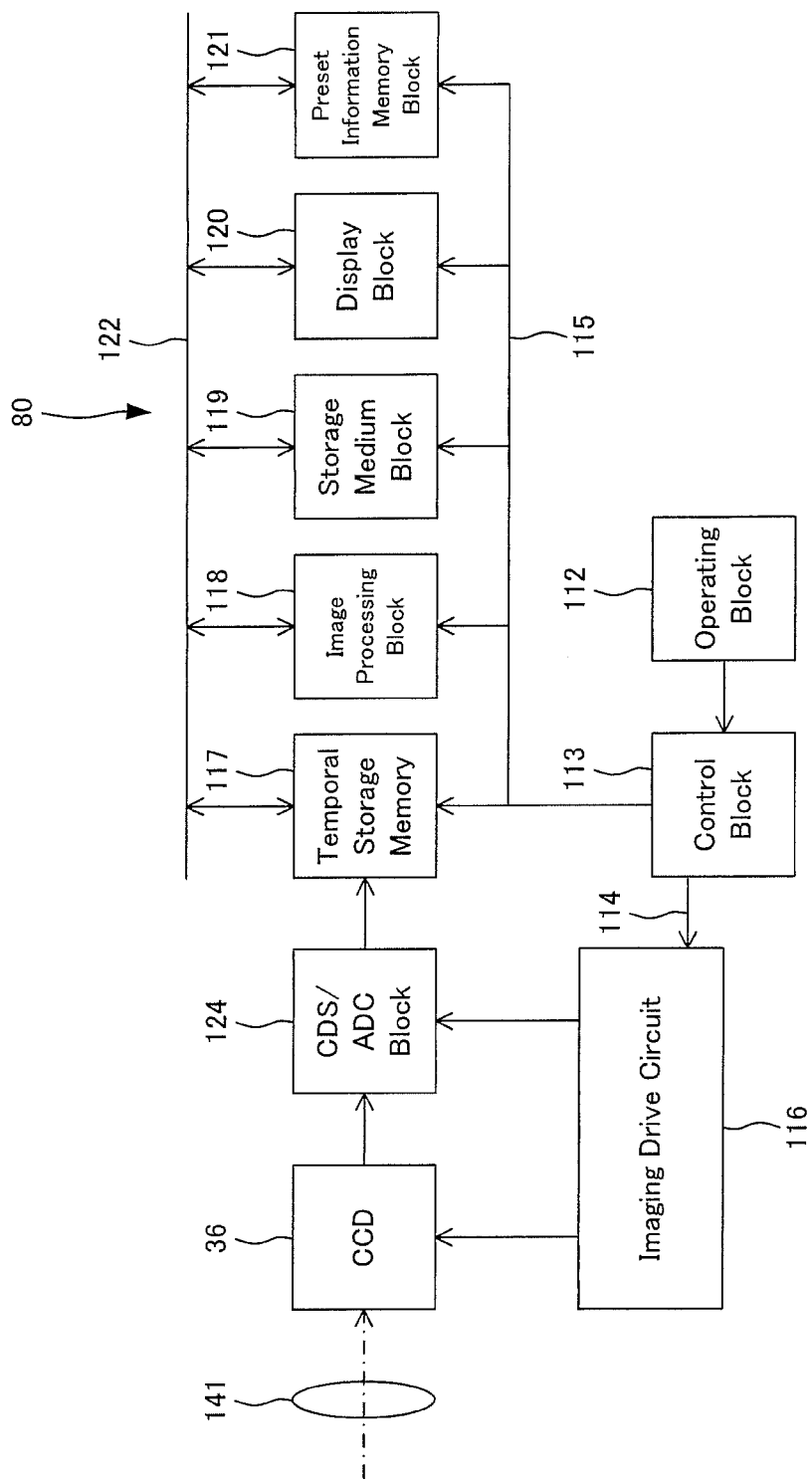
FIG. 21 is a block diagram illustrative of the control architecture of a digital camera according to a certain embodiment of the invention.

FIG. 19 is a block diagram illustrative of the internal circuitry of a main part of the digital camera 80 according to the embodiment of the invention here. In the following explanation, the processing means are constructed typically from a CDS/ADC portion 124, a temporal storage memory 117, an image processing portion 118 and so on, and the storage means is made up of storage medium, and so on.

As shown in FIG. 19, the digital camera 80 includes an operating portion 112, a control portion 113 connected to the operating portion 112, an imaging drive circuit 116 and a temporal storage memory 117 connected to the control signal output port of the control portion 113 via buses 114 and 115, an image processing portion 118, a storage medium portion 119, a display portion 120, and a preset information storage memory portion 121.

The temporal storage memory 117, image processing portion 118, storage medium portion 119, display portion 120 and preset information storage memory portion 121 are designed such that data are mutually entered in or produced out of them via a bus 122, and the imaging drive circuit 116 is connected with the imaging device 36 and CDS/ADC portion 124.

The operating portion 112 is a circuit including various input buttons and switches, through which event information entered (by the camera operator) from outside is notified to the control portion 113. The control portion 113 is a central computing unit that is made up of typically a CPU and has a built-in program memory (not shown): it is a circuit that, according to the program loaded in that program memory, has control over the digital camera 80.

The imaging device 36 such as the CCD is the one that is driven and controlled by the imaging drive circuit 116, and converts or transforms light quantity per pixel of the object image formed through the imaging optical system 141 into electrical signals that are in turn sent out to the CDS/ADC portion 24.

The CDS/ADC portion 124 is a circuit that amplifies electrical signals entered from the imaging device 36 and implements analog-to-digital conversion. Then, image raw data (Bayer data: hereinafter called the RAW data) subjected only to amplification and digital conversion are sent out to the temporal storage memory 117.

The temporal storage memory 117 is a buffer made up of typically an SDRAM: it is a memory device for temporal storage of the RAW data produced out of the CDS/ADC portion 124. The image processing portion 118 is a circuit that reads out the RAW data stored in the temporal 30 storage memory 117 or the RAW data stored in the storage medium portion 119 thereby electrically implementing various forms of processing including distortion correction, based on an image quality parameter instructed by the control portion 113.

The storage medium portion 119 detachably receives a card type or stick type of recording medium comprising typically a flash memory so that the RAW data transferred from the temporal memory 117 or image data processed at the image processing portion 118 are recorded and held in that flash memory.

The display portion 120 is made up of a liquid crystal display monitor or the like to display the taken RAW data or image data, operating menus or the like on it. The preset information storage memory portion 121 includes a ROM portion having various image quality parameters previously loaded in it, and a RAM portion for storing an image quality parameter read out of that ROM portion by entering operation of the operating portion 112.

The thus setup digital camera 80 makes use of the inventive lens system as the imaging optical system 114, providing an imaging apparatus that is of small-format size and well fit for taking of moving images.

It is to be understood that some embodiments described herein are not intended as limitations on the present invention. Although many exemplary specific details are included in the explanation of illustrative embodiments, it will be readily apparent to those skilled in the art that varying substitutions or modifications may be made to such detailed disclosures without departing from the scope of the invention. In other words, some exemplary embodiments of the invention have been described without losing the generality of the invention recited in the claims, and imposing any particular limitations on the invention.

POSSIBLE APPLICATIONS TO THE INDUSTRY

According to the present invention, it is possible to provide an image-shake correction apparatus of smaller size than ever before and an imaging apparatus incorporating the same.

What is claimed is:

1. An image-shake correction apparatus, comprising:
a base part including a permanent magnet, and
a moving part having a coil located in a position opposite to said permanent magnet, wherein:
said moving part is provided with an imaging device for photoelectric conversion of light,
said permanent magnet and said coil form together a voice coil motor,
said permanent magnet includes a cutout, and
said cutout is a space for receiving a portion of said moving part when said moving part is driven by said voice coil motor, and by receiving a portion of said moving part in said space, interference between said moving part and said permanent magnet is prevented.

2. The image-shake correction apparatus according to claim 1, wherein said permanent magnet comprises a first magnet portion and a second magnet portion, the second magnet portion being oppositely magnetized on a coil side to said first magnet portion, and lengths of said first magnet portion and said second magnet portion differ to form the cutout.

3. An image-shake correction apparatus, comprising:
a base part including a permanent magnet, and
a moving part having a coil located in a position opposite to said permanent magnet, wherein:
said permanent magnet and said coil form together a voice coil motor, and
said permanent magnet comprises a first magnet portion and a second magnet portion, the second magnet portion being oppositely magnetized on a coil side to said first magnet portion, and lengths of said first magnet portion and said second magnet portion differ to form a cutout.

4. The image-shake correction apparatus according to claim 3, wherein said cutout is located in a position that at least partly overlaps with a range of movement of said moving part by said voice coil motor.

5. The image-shake correction apparatus according to claim 1 or 3, wherein said coil is formed in a trapezoidal shape whose portion corresponding to said cutout defines an oblique side.

6. The image-shake correction apparatus according to any one of claim 1 or 3, wherein said coil increases in the number of turns depending on a volume of said cutout.

7. The image-shake correction apparatus according to claim 1 or 3, further comprising a magnet support portion including an opposite permanent magnet that is located in opposition to, and spaced away from, said permanent magnet with said moving part sandwiched between them, wherein a magnetic pole of said opposite permanent magnet on said moving part side is different from a magnetic pole of said permanent magnet on said moving part side.

8. The image-shake correction apparatus according to claim 2 or 3, wherein a first direction is defined by a direction of providing said second magnet portion relative to said first magnet portion and a second direction is defined by a direction which is orthogonal to said first direction and in which said first magnet portion and said second magnet portion differ in length, wherein:
in a center line of said coil extending in said second direction that connects a center of said coil with said first direction, a sum of a magnetic flux density in a sectional part having none of said cutout in said first direction and a magnetic flux density in a sectional part having said cutout in said first direction is zero.

9. The image-shake correction apparatus according to claim 8, wherein a sum of all magnetic flux densities throughout the sectional part having none of said cutout in said first direction and all magnetic flux densities throughout the sectional part having said cutout in said first direction is zero.

10. The image-shake correction apparatus according to claim 8, wherein the center line of said coil is offset relative to a demarcation line between said first magnet portion and said second magnet portion.

11. The image-shake correction apparatus according to claim 8, wherein a residual magnetic flux density of said first magnet portion is lower than a residual magnetic flux density of said second magnet portion.

12. The image-shake correction apparatus according to claim 11, wherein said first magnet portion and said second magnet portion are of different materials.

13. The image-shake correction apparatus according to claim 2 or 3, further including a magnet support potion comprising a first opposite magnet portion that is located in opposition to, and spaced away from, said first magnet portion with said moving part sandwiched between them and has a magnetic pole on said moving part side, said magnetic pole being different from a magnetic pole of said first magnet portion on said moving part side, and a second opposite magnet portion that is located in opposition to, and spaced away from, said second magnet portion with said moving part sandwiched between them and has a magnetic pole on said moving part side, said magnetic pole being different from a magnetic pole of said second magnet portion on said moving part side.

14. The image-shake correction apparatus according to claim 2 or 3, wherein said voice coil motor includes a first voice coil motor for moving said moving part in a first direction and a second voice coil motor for moving said moving in a second direction, wherein at least one of said first magnet portion and said second magnet portion is included in both said first voice coil motor and said second voice coil motor.

15. The image-shake correction apparatus according to claim 2 or 3, wherein said first magnet portion and said second magnet portion are separate ones.

16. An imaging apparatus, comprising said image-shake correction apparatus as recited in claim 1 or 3, and a body including said image-shake correction apparatus.

\* \* \* \* \*